Dec. 8, 1964   F. C. SIMON   3,160,137
REVERSIBLE POSITION INDICATING DIAL
Filed March 15, 1963
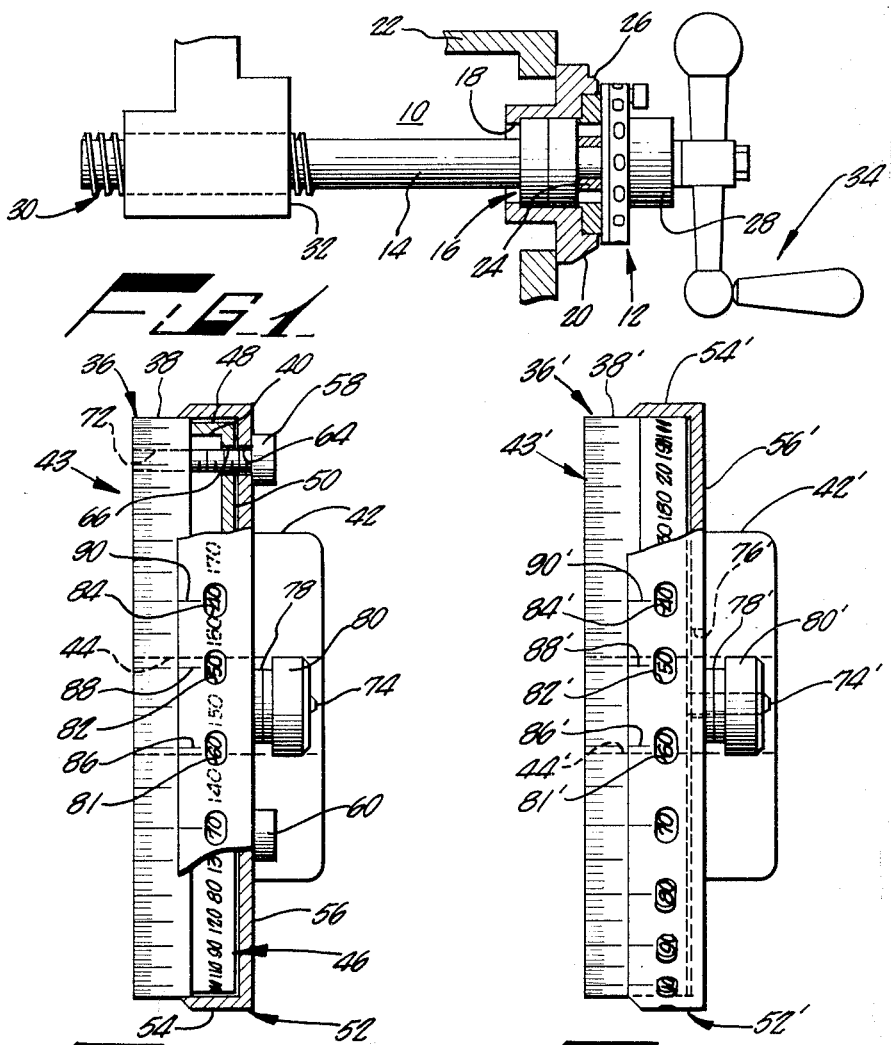
INVENTOR.
FRANK C. SIMON
BY
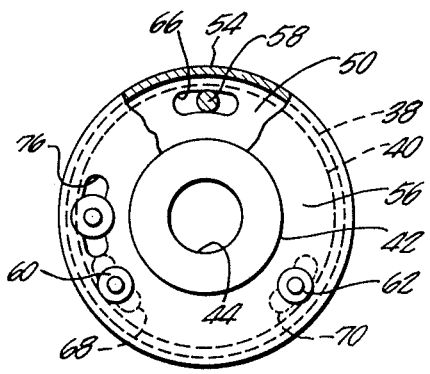
ATTORNEYS.

United States Patent Office 3,160,137
Patented Dec. 8, 1964

3,160,137
REVERSIBLE POSITION INDICATING DIAL
Frank C. Simon, 741 E. Grandview, Sierra Madre, Calif.
Filed Mar. 15, 1963, Ser. No. 265,498
8 Claims. (Cl. 116—115)

The present invention relates to improvements in manually controllable position indicating dials and, more particularly, to a novel reversible dial assembly for accurately indicating the position of a driven member coupled to a rotatable drive shaft.

In many industrial machines the position of a movable member from a reference position is selectively controlled by the rotation of a threaded drive shaft or feed screw. In such arrangements, a fine degree of control is maintained over the position of the movable member relative to the reference position through the use of a dial assembly coupled to the drive shaft. Generally, the dial assembly comprises a drum having a scale etched on its outer surface to extend around the drum. The drum is coupled for rotation with the drive shaft adjacent a reference mark on the machine. As the shaft is turned the scale turns to bring numbered markings of the scale in succession adjacent the reference mark to indicate the position of the movable member, generally to thousandths of an inch. Such dial assemblies are commonly found in milling machines, lathes, grinders, duplicating machines, shapers and the like wherein the position and travel of a movable table is accurately controlled through a plurality of manually rotatable drive shafts.

In the past such dial assemblies have been oriented for a single direction of travel. That is, the numbers of the scale generally increase from zero to a predetermined value around the drum in a clockwise direction. Thus, a progressive scale for table travel is only provided for clockwise rotation of the drive shaft. In the case of the drive shaft assembly for controlling the cross feed position of the movable table in a lathe and/or milling machine, such dial orientation only provides a progressive scale for travel of the table from the front to the back of the machine.

In many instances the drawings provided for the machining of a particular part are dimensioned from the back to the front of the machine. In such a case, if the machinist desires to utilize the progressive scale and machine the part by working from the front to the back of the machine he must first redimension the entire drawing. This, in most instances, requires an appreciable amount of time and allows for many errors in redimensioning, particularly when close dimension tolerances are indicated on the drawing for the machining of the part.

As an alternative, the machinist may work from the back to the front of his machine. To do so, however, the machinist, before each move of the table, must subtract the dimension listed on the drawing from the maximum value of the scale of the dial to determine the exact scale value which should be opposite the reference mark at the end of the move in order to insure an accurate repositioning of the part being machined. Such a procedure is laborious and time consuming. In addition, the possibility of positioning and repositioning errors is great not only because of possible errors in subtraction but also because the machinist may neglect to follow the results of this calculations in turning the shaft to the new dial indication prior to the actual machining of the part.

The time required for the machinist to perform the aforementioned subtraction operations materially increases the over-all labor costs for the machining of any given part. Further, errors in the machining of a part resulting either from miscalculations or by neglecting to follow the results of any given calculation are extremely costly in that the entire part thus machined may have to be scrapped. This problem is particularly acute in cases where a high degree of accuracy must be maintained in the machining of a given part.

In view of the above, the present invention provides a reversible dial assembly which is particularly adaptable to use on machines wherein the position of a movable member is controlled by the rotation of a shaft. The reversible dial assembly provides means whereby an increasing scale may always be provided relative to the direction of rotation of the shaft and hence the linear direction of movement of the movable member. Thus, regardless of whether the machinist is working from the front to the back or from the back to the front of his machine he at all times has available to him a progressive scale for indicating the exact position of the movable member. Thus, the machinist may follow exactly the dimensioning of any drawing without the necessity of performing a multiple of subtraction operations during the machining of any part. In this manner, the use of the present invention materially reduces the amount of time required to machine a part and substantially reduces the chances of machining errors inherent in the prior art position indicating apparatus.

Briefly, the reversible dial assembly of the present invention includes a first means for coupling to a drive shaft for rotation therewith and defining a series of markings arranged in a ring to form an annular scale. Second means positioned adjacent to the annular scale define a first and a second set of numbers of increasing and decreasing value, respectively. The numbers provide a number value for particular markings on the scale. Overlying the second means is a cover member for selectively masking one of the sets of numbers such that an increasing series of numbers may always be exposed relative to the direction of rotation of the shaft.

Thus, when the reversible dial assembly of the present invention is employed with the drive shaft for controlling the cross feed of a table in a milling machine or lathe, the machinist may selectively mask one set of numbers and expose an increasing series of numbers for the dial assembly in turning the shaft in a clockwise direction to work a part from the front to the back of machine. Similarly, when the machinist is working the part from the back to the front of the machine he may selectively mask the other set of numbers to expose a series of numbers increasing in value relative to the counterclockwise direction of motion of the shaft.

Thus, in all instances the machinist simply adds the dimensions on the working drawings in selectively positioning and repositioning a part which he is machining.

In addition to the aforementioned advantages of the present invention, the reversible dial assembly is completely adaptable to conventional machines having a rotatable shaft positioning control arrangement extremely simple and inexpensive to manufacture.

The above, as well as other features of the present invention, may be more clearly understood by reference to the following detailed description when considered with the drawings, in which:

FIGURE 1 is a cross-sectional schematic representation of a positioning arrangement including a rotatable shaft in combination with one form of the reversible dial assembly of the present invention;

FIGURE 2 is a partially sectioned side view of the reversible dial in accordance with one form of the present invention;

FIGURE 3 is a partially sectioned end view of the reversible dial assembly illustrated in FIGURE 2; and FIGURE 4 is a partially sectioned side view of a reversible dial in accordance with a preferred form of the present invention.

Referring specifically to the drawings, FIGURE 1 is a cross-sectional schematic representation of a cross feed position control arrangement 10 for a milling machine including an indicating dial 12 in accordance with the present invention. As represented, the cross feed position control arrangement 10 includes a drive shaft 14 bearing mounted at 16 for rotation about its longitudinal axis through an opening 18 in a bracket member 20. The bracket member 20 is coupled to a frame 22 of the milling machine by means not specifically shown to extend along an outer face of the frame. A ring 24 extends around the shaft 14 against the bearing arrangement 16 for rotation with the shaft 14. The indicating dial 12 extends around the shaft 14 for rotation therewith against the radial surface of the ring 24 remote from the bearing arrangement 16. A marking, indicated at 26 on the bracket 20, provides a reference mark for the indicating dial 12 which is secured about the shaft against a rotatable ring 24 by a lock nut 28.

One end of the shaft 14 is threaded as indicated at 30 and extends into a feed nut 32 coupled to the movable table of a milling machine.

Coupled to the opposite end of the shaft 14 is a crank type handle 34. By turning the handle 34, rotary motion is imparted to the shaft 14 to turn the threaded end of the shaft within the nut 32. The nut, in turn, travels with the shaft 14 along the shaft 14 in a direction determined by the direction of rotation of the handle 34. As the shaft 14 turns, the dial assembly 12 also turns to provide an indication of the position of the table relative to a reference position, thereby aiding in the accurate positioning and repositioning of the table.

The indicating dial assembly 12 represented in FIGURE 1 may be of a form illustrated in FIGURES 2 and 3 or may be of the preferred form of the present invention as illustrated in FIGURE 4.

The form of the present invention illustrated in FIGURES 2 and 3 comprises a drum member 36 having a plurality of stepped annular surfaces of decreasing radial dimension 38, 40 and 42. The drum 36 also includes a central opening 44 for receiving a drive shaft such as the shaft 14 illustrated in FIGURE 1. Etched into the annular surface 38 of the drum member 36 is a plurality of evenly spaced markings forming an annular scale 43 around the drum. Preferably the markings are spaced from each other relative to the arrangement of the threaded end 30 of the drive shaft 14 such that the distance between adjacent marks indicates one-thousandth of an inch of travel of the table along the shaft 14. In the dial arrangement, two hundred such markings are provided the drum member 36.

Positioned around the annular surface 40 of the drum member 36 is a flanged ring member 46. The flanged ring member 46 includes an outer annular portion 48 and a substantially flat radial portion 50. The flanged ring member 46 is dimensioned for rotary sliding movement about and relative to the annular surface 40 of the drum member 36.

Engraved in and about the outer portion 48 of the flanged ring member 46 are first and second sets of numbers. The numbers of each set are evenly spaced from each other and are physically interlaced with the numbers of the other set. The numbers of the first set increase in value in a clockwise direction about the outer portion 48 from zero to one-hundred-ninety in steps of ten while the numbers of the second set decrease in value in the clockwise direction from one-hundred-ninety to zero in steps of ten. In other words, the numbers of the second set increase in value from zero to one-hundred-ninety in a counterclockwise direction around the outer portion 48. The numbers of the two sets are arranged as illustrated with the zeros on each set being adjacent each other and the numbers of each set increasing in value in opposite directions about the outer portion 48. In particular, the numbers of the two sets are arranged such that adjacent numbers are separated by approximately five divisions or marks on the scale and provide a value for the marks which they are opposite.

Positioned over the flanged ring member 46 to contact the annular surface 38 of the drum member 36 is a flanged cover member 52. The flanged cover member includes an outer annular portion 54 and a substantially flat radial portion 56. The cover member 52 is dimensioned such that the outer portion 48 of the ring member 46 while making a snug fit with the annular surface 38 of the drum member 36. The radial portion 56 extends along and is slightly spaced from the radial portion 50 of the ring member 46 to the annular surface 42 of the drum 36.

The cover member 52 is fixedly secured for rotation with the drum member 36 about the shaft 14 by a plurality of screws 58, 60 and 62. The screws 58, 60 and 62 each extend through small openings such as 64 in the radial portion 56 of the cover member 52, through curved elongated slots 66, 68 and 70, respectively, in the ring member 46 and into threaded holes such as 72 in the drum member 36. By tightening the screw members 58, 60 and 62 the cover member 52 is secured tightly to the drum member 36 while maintaining a small separation between the cover member and the ring member 46 to allow sliding rotation of the ring member over the annular surface 40 of the drum member 36.

The elongated slots, such as 66, combine with the associated screw members, such as 58, to limit the relative rotary movement between the ring member 46 and the drum member 36. In particular, the ends of the elongated slots provide stops for the screw members.

In addition to the above, means are provided for selectively locking the ring member 46 to the cover member 52 for rotation with the drum member 36 about the drive shaft 14. The locking means, by way of example, includes a threaded stud 74 extending from the radial portion 50 of the ring member 46 through a curved elongated slot 76 in the cover member 52 to receive a washer 78 and a nut 80. By turning the nut 80 the ring member 46 is locked in position relative to the cover member 52 for rotation with the drum member 36.

The stud and nut arrangement, thus described, may also be utilized to manually adjust the angular position of the ring member 46 relative to the drum 36. For example, by loosening the nut 80 and using the nut and stud combination as a handgrip the ring member may be readily turned about the annular surface 40 of the drum 36 between the limits defined by the screws 58, 60 and 62 and their associated slots 66, 68 and 70.

As previously described, the primary function of the cover member 52 is to provide means for masking one of the sets of numbers disposed on the outer portion 48 of the ring member 46. The masking operation may be performed by any number of different configurations including a combination of slots or openings in the outer portion 54 of the cover member 52 or by utilizing adjacent materials having different light transmissive properties. By way of example only, the cover 52 is illustrated as including a plurality of elongated apertures such as 81, 82 and 84 illustrated in FIGURE 1. The apertures are evenly spaced around the outer portion 54 of the cover member 52. In the arrangement illustrated, the centers of the apertures, as represented by the marks 86, 88 and 90, respectively, adjacent the scale 43, are spaced from each other by ten marks or divisions of the scale. The major axis of the apertures are such as to insure that when the numbers of one set of numbers are exposed through the apertures the numbers of the other set are covered by the portions of the cover member 52 between the apertures.

By manually shifting the ring member 46 under the cover member 52, a particular one of the two sets of numbers may be exposed through the apertures. In particular, it is preferred that the elongated slots, such as 66, be dimensioned such that when the slot and screw arrangement limit the travel of the ring member 46 in one direction one of the sets of numbers is exposed through the apertures while when the elongated slot and screw member arrangements limit the travel of the ring member 46 in an opposite direction, numbers of the other set of numbers are exposed through the apertures.

Thus, in the embodiment illustrated in FIGURES 2 and 3 selective movement may be manually imparted to the ring member 46 to control the selective masking of one of the two sets of numbers disposed on the ring member 46 to insure that an increasing series of numbers is always exposed through the apertures of the cover member 52 relative to the direction of rotation of the drive shaft 14.

Referring now to FIGURE 4, there is illustrated a preferred form of the reversible dial assembly of the present invention. The preferred form of the present invention is structurally simpler than the embodiment illustrated in FIGURES 2 and 3 in that it includes but two parts, namely the drum and the cover member, and is simpler to adjust, assemble and service.

The preferred form of the present invention is basically similar to the embodiment previously described in connection with FIGURES 2 and 3. Therefore only the structural and functional differences between the embodiments is hereinafter described.

As represented, the preferred form of the present invention includes a drum member 36' having outer and inner adjacent annular surfaces 38' and 42'. Disposed on the annular surface 38' about the drum member 36' is a plurality of markings arranged to form a scale similar to that described in connection with FIGURE 2. Also disposed about the outer annular surface 38' are the two sets of numbers as previously described in connection with FIGURE 2. Adjacent numbers are spaced from each other by five divisions or marking of the scale and provide a value for the marks opposite the numbers.

Disposed over and around a portion of the drum 36' is a flanged cover member 52' including an outer portion 54' and a radial portion 56'. The cover member 52' is dimensioned such that the outer portion 54' makes sliding contact with the annular surface 38' of the drum member 36'. Thus, the cover member 52' may be manually rotated about and relative to the drum member 36'. The radial portion 56 extends along a radial surface of the drum member 36' to the annular surface 42' as illustrated.

The cover member 52' functions to selectively mask one of the sets of numbers in order to allow an increasing series of numbers to be exposed relative to the direction of rotation of the drive shaft 14.

As illustrated, to accomplish this, the cover member 52' is constructed similar to the cover member 52 of FIGURES 2 and 3 with a plurality of apertures such as 81', 82' and 84' spaced around the outer portion 54'. The centers of the apertures, as indicated by the markings 86', 88' and 90', are spaced from each other by ten divisions or markings of the scale. Similar to the cover member 52 of FIGURES 2 and 3, the apertures such as 90', 82' and 84' are dimensioned to expose one of the two sets of numbers while masking the other set of numbers by the portions between the apertures. Selective rotation of the cover member 52' exposes one or the other of the two sets of numbers in order to insure that an increasing series of numbers may be exposed relative to the direction of rotation of the shaft 14.

In addition to the cover member 52' the preferred embodiment of the present invention includes means for limiting the relative rotary movement between the cover member and the drum member 36' as well as means for selectively locking the cover member for rotation with the drum member. Such means, by way of example, include a threaded stud 74', extending from the drum member 36' through an elongated slot 76' in the radial portion 56' to receive a washer 78' and a nut 80'. By tightening the nut 80' to press the washer 78' against the radial portion 56' the cover member 52' is secured for rotation with the drum member 36'. By loosening the nut 80 the cover member 52 may be manually rotated about the annular surface 38' of the drum 36'. The threaded stud 74' cooperates with the elongated slot 76' to provide the means for limiting the rotary travel of the cover member 52' relative to the drum member 36'. Preferably, the slot 76 is shaped such that when the stud contacts one end of the slot a first set of numbers is exposed through the apertures of the cover member 52' while when the stud 74 is contacting an opposite end of the slot 76' the other set of numbers is exposed through the apertures of the cover member.

Thus, in operation, when it is desired to shift the cover member relative to the drum member in order to expose an increasing set of numbers relative to the direction of rotation of the drive shaft 14, the nut 80' is loosened and the cover member 52' rotated over the annular surface 38' to a new stop position defined by the elongated slot and stud. The nut is then tightened to secure the cover member to the drum for rotation with the drum in response to a turning of the drive shaft 14.

In this manner, the reversible dial assembly of the present invention is readily controllable to provide, at all times, an increasing number scale relative to the direction of rotation of the drive shaft.

What is claimed is:

1. In a position indicating assembly, the combination of:
   first means having a surface with a series of markings arranged to form a scale;
   second means disposed adjacent the scale having a surface with first and second like sets of numbers disposed thereon and arranged along a common line, the first set of numbers being arranged to increase in value between predetermined numbers and the second set of numbers being arranged to decrease in value between the same predetermined numbers;
   third means for supporting the second means for selectively controllable and limited movement relative to the first means such that the sets of numbers provide a number value for particular markings;
   and fourth means coupled to the first means for masking one of the sets of numbers and for simultaneously exposing all of the numbers of the other set in accordance with the position of the second means relative to the first means.

2. The apparatus defined in claim 1 including means for selectively locking the second means relative to the first and fourth means.

3. In an assembly for selectively positioning a movable member, apparatus for indicating and controlling the position of the member, comprising:
   a first means coupled to the movable member and defining a surface having a series of markings arranged to form a scale;
   second means extending from the first means and defining a surface having first and second similar sets of numbers positioned adjacent to the markings of the scale to provide a number value for particular markings, the first set of numbers being arranged to increase in value between predetermined numbers proceeding in one direction alon gthe scale and the second set of numbers being arranged to decrease in value between predetermined numbers proceeding ing the same direction along the scale;
   and cover means disposed adjacent the first means and supported for manually controllable movement over a portion of the second means for masking one of the sets of numbers and for simultaneously exposing all of the numbers of the other set upon movement along the scale.

4. In an assembly for selectively positioning a movable member, apparatus for indicating and controlling the position of the movable member, comprising:

a rotatable drum operatively coupled to the movable member and defining a cylindrical surface with a series of markings arranged circumferentially thereof to form a scale and first and second like sets of numbers physically interlaced with each other adjacent evenly spaced markings to provide a number value for particular markings, the first set of numbers increasing in value between predetermined numbers proceeding in one direction from a selected location on the scale and the second set of numbers decreasing in value between predetermined numbers proceeding in the same direction from the selected location;

and cover means supported for manually controllable movement angularly relative to the drum for masking one of the sets of numbers and for simultaneously exposing all of the numbers of the other set.

5. A reversible indicating dial operable in response to rotation of a drive shaft, comprising:

a rotatable drum member coupled to the drive shaft and having a series of markings arranged as a scale disposed about the drum member;

an inner annular member disposed around the shaft for limited angular movement relative to the drum member and having disposed on an outer annular surface first and second like sets of numbers of increasing and decreasing value, respectively, between predetermined numbers, the sets of numbers being disposed circumferentially of the annular surface along a common line, the numbers of the first and second sets being evenly interlaced about the annular surface to provide a number value for particular markings of the scale;

and an outer cover member positioned over the inner member for masking one of the sets of numbers and for simultaneously exposing all of the numbers of the other set depending upon the angular position of the inner member relative to the drum member such that an increasing series of numbers may always be exposed relative to the direction of rotation of the shaft.

6. A selectively reversible indicating dial operable in response to the rotation of a drive shaft, comprising:

a rotatable drum member coupled to the drive shaft and having disposed on an outer annular surface thereof a series of markings arranged in a scale and first and second like sets of numbers of increasing and decreasing value, respectively, between predetermined numbers, the sets being arranged along a common line circumferentially of the drum member, the numbers of the first and second sets being interlaced around the annular surface to provide a number value for particular markings of the scale;

and an outer cover member supported for manually controllable limited angular movement over the drum member for masking one of the sets of numbers and for simultaneously exposing all of the numbers of the other set depending upon the angular position of the outer cover member relative to the drum member such that an increasing series of numbers may always be exposed relative to the direction of rotation of the shaft.

7. A selectively reversible indicating dial operable in response to the rotation of a drive shaft, comprising:

a rotatable drum member for coupling to the drive shaft and having disposed on an outer annular surface a series of markings arranged in like scale and first and a second sets of numbers of increasing and decreasing value, respectively, between predetermined numbers, the numbers of the first and second set being disposed adjacent particular markings to provide a number value indication therefor;

and an outer cover member supported for limited angular movement relative to the drum member for masking one of the sets of numbers and for exposing all of the numbers of the other set such that an increasing series of numbers may always be exposed relative to the direction of rotation of the shaft.

8. A selectively reversible indicating dial operable in response to rotation of a drive shaft, comprising:

first means for coupling to the drive shaft for rotation therewith and defining a series of markings arranged in a ring to form an annular scale;

second means defining first and second like sets of numbers of increasing and decreasing value, respectively, between predetermined numbers and arranged to define a common line of numbers and disposed adjacent the annular scale to provide a number value of particular markings;

and third means overlying the second means for selectively masking one of the sets of numbers and for simultaneously exposing all of the numbers of the other set such that an increasing series of numbers may always be exposed relative to the direction of rotation of the shaft.

References Cited in the file of this patent

UNITED STATES PATENTS

| | | |
|---|---|---|
| 2,584,963 | Hoelscher | Feb. 5, 1952 |
| 2,661,903 | Godlbach | Dec. 8, 1953 |
| 2,739,303 | Erickson | Mar. 20, 1956 |

FOREIGN PATENTS

| | | |
|---|---|---|
| 317,568 | Germany | Dec. 22, 1919 |